(12) United States Patent
Namura et al.

(10) Patent No.: US 12,249,223 B2
(45) Date of Patent: Mar. 11, 2025

(54) MONEY HANDLING SYSTEM, MONEY HANDLING METHOD, AND MONEY HANDLING APPARATUS

(71) Applicant: Glory Ltd., Himeji (JP)

(72) Inventors: Shigeo Namura, Hyogo (JP); Shota Sakaue, Hyogo (JP); Atsushi Yukawa, Hyogo (JP)

(73) Assignee: GLORY LTD., Himeji (JP)

( * ) Notice: Subject to any disclaimer, the term of this patent is extended or adjusted under 35 U.S.C. 154(b) by 142 days.

(21) Appl. No.: 17/696,876

(22) Filed: Mar. 17, 2022

(65) Prior Publication Data

US 2022/0301399 A1 Sep. 22, 2022

(30) Foreign Application Priority Data

Mar. 19, 2021 (JP) ................. 2021-046298

(51) Int. Cl.
| | |
|---|---|
| G06Q 20/00 | (2012.01) |
| G06Q 20/20 | (2012.01) |
| G07G 1/00 | (2006.01) |

(52) U.S. Cl.
CPC ......... *G07G 1/0027* (2013.01); *G06Q 20/202* (2013.01)

(58) Field of Classification Search
CPC .................................................. G06Q 20/202
See application file for complete search history.

(56) References Cited

U.S. PATENT DOCUMENTS

2002/0063035 A1 5/2002 Blad et al.
2014/0124573 A1 5/2014 Doi et al.

FOREIGN PATENT DOCUMENTS

| JP | 1-274295 A | | 11/1989 |
|---|---|---|---|
| JP | 8248246 A | * | 9/1996 |
| JP | 2012-181576 A | | 9/2012 |
| JP | 2013-8209 A | | 1/2013 |

OTHER PUBLICATIONS

Extended European search report issued on Aug. 18, 2022, in corresponding European patent Application No. 22162516.3, 8 pages.

* cited by examiner

*Primary Examiner* — Rokib Masud
(74) *Attorney, Agent, or Firm* — XSENSUS LLP

(57) ABSTRACT

A money handling system includes a first money handling apparatus, a money cassette to which money is to be transferred from the first money handling apparatus, a second money handling apparatus to which the money is to be transferred from the money cassette, a memory unit that is included in the money cassette and stores specific information that identifies a timing at which the money is transferred from the first money handling apparatus to the money cassette, and a management unit that calculates sales proceeds for each predetermined period, based on the specific information received by the second money handling apparatus from the memory unit and an amount of the money transferred from the money cassette to the second money handling apparatus.

12 Claims, 6 Drawing Sheets

MONEY HANDLING SYSTEM, MONEY HANDLING METHOD, AND MONEY HANDLING APPARATUS

CROSS-REFERENCE TO RELATED APPLICATION

This application claims priority to Japanese Patent Application No. 2021-046298 filed on Mar. 19, 2021, the disclosure of which including the specification, the drawings, and the claims is hereby incorporated by reference in its entirety.

TECHNICAL FIELD

The present disclosure relates to a money handling system, a money handling method, and a money handling apparatus for handling money.

BACKGROUND

A conventional checkout counter or the like in a store is provided with a cash settlement apparatus for settling payments to be made by customers. The cash settlement apparatus receives a payment from a customer and dispenses change, based on information on the payment, which is information acquired by the point of sale (POS) function.

The back office or the like of the store is provided with a cash accounting apparatus to prepare change funds for replenishing the cash settlement apparatus or collect and manage sales proceeds from the cash settlement apparatus. The cash accounting apparatus stores the sales proceeds and the like collected from the cash settlement apparatus and discharges a change fund or the like for replenishing the cash settlement apparatus. A cash system comprising the cash settlement apparatus and the cash accounting apparatus described above is disclosed in PTL 1, for example.

In the cash accounting apparatus that manages sales proceeds, it is common to count and manage sales proceeds for each sales day. In the cash accounting apparatus configured to count sales proceeds based on the time when the sales proceeds are deposited into the cash accounting apparatus, for example, sales proceeds deposited after the date are counted as sales for the next day although the sales proceeds should be counted as sales for the same day, causing inconvenience in sales management. To address such inconvenience, for example, PTL 2 discloses a cash handling apparatus in which dates for which the sales proceeds remain unprocessed are displayed on a display and, in response to a specific date being selected from among the displayed dates, cash is handled as the sales proceeds for the selected specific date.

CITATION LIST

Patent Literature

PTL 1
Japanese Patent Application Laid-Open No. 2013-008209
PTL 2
Japanese Patent Application Laid-Open No. H01-274295

SUMMARY

Technical Problems

In the money handling system disclosed in PTL 1, when the date when the sales proceeds are deposited into the cash accounting apparatus and the date when the deposited sales proceeds are to be counted are different, as in PTL 2, it is necessary to select the date when sales are to be counted. The invention disclosed in PTL 2 involves manual operation, such as selecting a specific date among dates for which the sales proceeds remain unprocessed. Not only does such manual operation involve the time and effort of an operator, but also the operator may make a mistake during the operation, resulting in failure to count sales proceeds for a correct date.

Solutions to Problems

Accordingly, the present disclosure provides a money handling system, a money handling method, and a money handling apparatus that ensure that sales proceeds are counted as those for a period for which the sales proceeds are to be counted.

A money handling system according to an aspect of the present disclosure comprises a first money handling apparatus, a money cassette to which money is to be transferred from the first money handling apparatus, a second money handling apparatus to which the money is to be transferred from the money cassette, a memory unit that is comprised in the money cassette and stores specific information that identifies a timing at which the money is transferred from the first money handling apparatus to the money cassette, and a management unit that calculates sales proceeds for each predetermined period, based on the specific information received by the second money handling apparatus from the memory unit and an amount of the money transferred from the money cassette to the second money handling apparatus.

The money handling system according to the aspect of the present disclosure may comprise a plurality of the first money handling apparatuses, each of the plurality of first money handling apparatuses being configured to perform a process for settling a payment, and the second money handling apparatus may perform a depositing process on money transferred from each of the plurality of first money handling apparatuses to the money cassette.

In the money handling system according to the aspect of the present disclosure, the specific information may be information that identifies a timing at which the money cassette storing the transferred money is removed from the first money handling apparatus.

In the money handling system according to the aspect of the present disclosure, the specific information may be information that identifies a timing at which the first money handling apparatus receives an instruction operation for transferring the money from the first money handling apparatus to the money cassette.

In the money handling system according to the aspect of the present disclosure, the specific information may be recognition information unique to the money cassette, and the management unit may receive the specific information and timing information from the first money handling apparatus, the timing information being information indicating a timing at which the money is transferred from the first money handling apparatus to the second money handling apparatus via the money cassette, and store the specific information and the timing information received from the first money handling apparatus in association with each other.

In the money handling system according to the aspect of the present disclosure, in response to the money cassette being attached to the second money handling apparatus after the predetermined period has elapsed, the management unit may add the amount of the money transferred from the money cassette to the second money handling apparatus to sales proceeds for the predetermined period when the timing identified by the specific information is within the predetermined period.

In the money handling system according to the aspect of the present disclosure, the second money handling apparatus may comprise the management unit.

A money handling method according to an aspect of the present disclosure comprises transferring money from a first money handling apparatus to a money cassette; receiving, by a second money handling apparatus, the money from the money cassette; storing, in a memory unit comprised in the money cassette, specific information that identifies a timing at which the money is transferred from the first money handling apparatus to the money cassette; and calculating, by a management unit, sales proceeds for each predetermined period, based on the specific information received by the second money handling apparatus from the memory unit and an amount of the money transferred from the money cassette to the second money handling apparatus.

In the money handling method according to the aspect of the present disclosure, the calculating, by the management unit, of sales proceeds for each predetermined period may comprise calculating sales proceeds for one day.

In the money handling method according to the aspect of the present disclosure, the calculating, by the management unit, of sales proceeds for each predetermined period may comprise calculating sales proceeds for a preset period from a first predetermined time to a second predetermined time.

In the money handling method according to the aspect of the present disclosure, the specific information may be information that identifies a date on which the money is transferred.

In the money handling method according to the aspect of the present disclosure, the specific information may be information that identifies a time at which the money is transferred.

In the money handling method according to the aspect of the present disclosure, in response to the money cassette being attached to the second money handling apparatus after the predetermined period has elapsed, the management unit may add the amount of the money transferred from the money cassette to the second money handling apparatus to sales proceeds for the predetermined period when the timing identified by the specific information is within the predetermined period.

A money handling apparatus according to an aspect of the present disclosure comprises a cassette attachment unit to which a money cassette in which money is stored is to be attached, a money handling unit that handles the money, the money being transferred from the money cassette, and an information receiving unit that receives specific information from a memory unit comprised in the money cassette, the specific information being information that identifies a timing at which the money is transferred via the money cassette.

The money handling apparatus according to the aspect of the present disclosure may further comprise a management unit that calculates sales proceeds for each predetermined period, based on an amount of the money handled by the money handling unit and the specific information.

Advantages

One or more aspects of the present disclosure ensure that sales proceeds are counted as those for a period for which the sales proceeds are to be counted.

DETAILED DESCRIPTION

Embodiments of the present disclosure will be described in detail hereinafter with reference to the drawings. In some cases, detailed description more than necessary may be omitted. For example, detailed description of well-known matters or repeated description or the like of substantially the same configuration may be omitted. The following description and the drawings to be referred to are provided to help those skilled in the art understand the present disclosure and are not intended to limit the scope of the claims disclosed herein. For example, matters described for a certain embodiment may also apply to other embodiments, and elements provided in a certain embodiment may be provided in other embodiments.

Embodiment 1

Configuration

Figure 1:
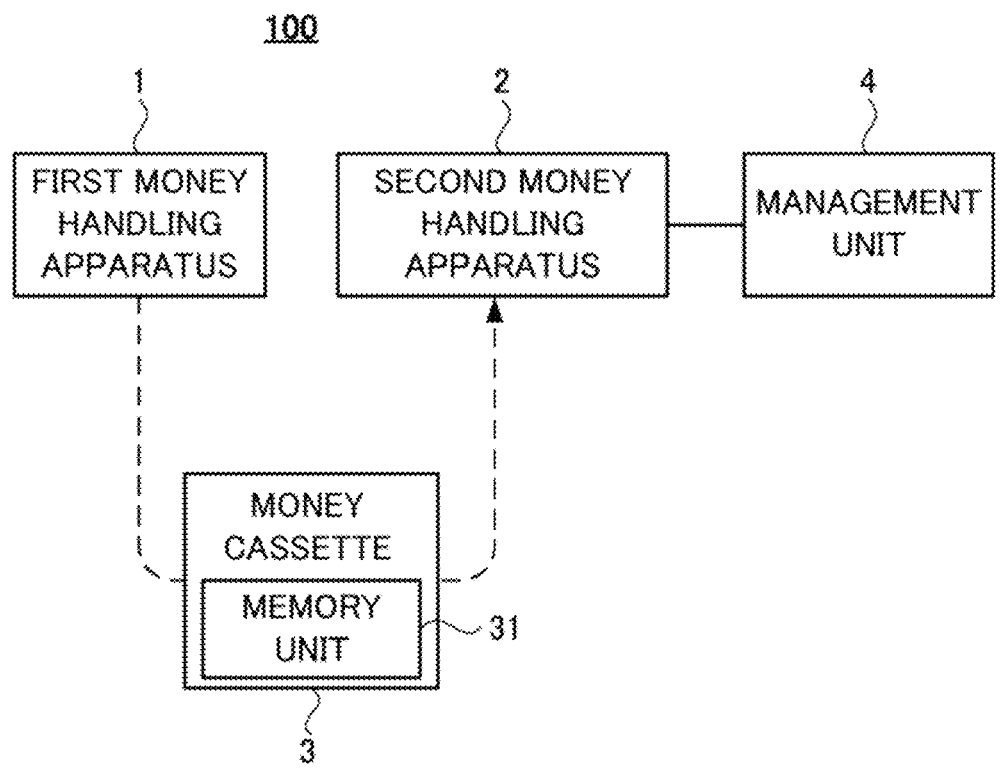
FIG. 1 is a diagram illustrating the configuration of a money handling system according to one or more aspects of the disclosed subject matter.

First, a money handling system 100 according to Embodiment 1 of the present disclosure will be described. As illustrated in FIG. 1, the money handling system 100 comprises a first money handling apparatus 1, a second money handling apparatus 2, a money cassette 3, and a management unit 4. The second money handling apparatus 2 and the management unit 4 are communicably connected to each other via wireless or wired communication means.

The first money handling apparatus 1 and the second money handling apparatus 2 are capable of storing money and configured to handle money. The money cassette 3 is portable and capable of storing money. The money cassette 3 is attachable to the first money handling apparatus 1 and the second money handling apparatus 2 and configured to allow money to be put in or taken out while the money cassette 3 remains attached to the first money handling apparatus 1 or the second money handling apparatus 2.

In Embodiment 1, the first money handling apparatus 1 transfers the stored money to the money cassette 3 attached thereto. The money cassette 3, which has been removed from the first money handling apparatus 1, is transported to the second money handling apparatus 2 by a person or other means and attached to the second money handling apparatus 2. The second money handling apparatus 2 receives the transfer of the money from the money cassette 3.

The money cassette 3 comprises a memory unit 31. The memory unit 31 stores specific information that identifies a timing at which money is transferred from the first money handling apparatus 1 to the money cassette 3. The specific information is generated by the first money handling apparatus 1 or the money cassette 3. The specific information is transmitted from the memory unit 31 to the second money handling apparatus 2 when the money cassette 3 is attached to the second money handling apparatus 2.

The specific information transmitted from the memory unit 31 of the money cassette 3 to the second money handling apparatus 2 is transmitted to the management unit 4. Further, the second money handling apparatus 2 transmits to the management unit 4 deposit amount information indicating the amount of money transferred from the first money handling apparatus 1 to the second money handling apparatus 2 via the money cassette 3. The management unit 4 performs a process of calculating the sales proceeds of the money transferred from the money cassette 3 to the second money handling apparatus 2, based on the specific information and the deposit amount information acquired from the second money handling apparatus 2.

The calculation of the sales proceeds is performed every predetermined period by the management unit 4. The predetermined period is one day, for example. The management unit 4 calculates the sales proceeds based on the specific information and the amount of money transferred from the first money handling apparatus 1 to the second money handling apparatus 2 via the money cassette 3 within the predetermined period. The result of calculation of the sales proceeds calculated by the management unit 4 is stored in a memory unit or the like of the management unit 4 as, for example, sales information.

Operation

Figure 2:
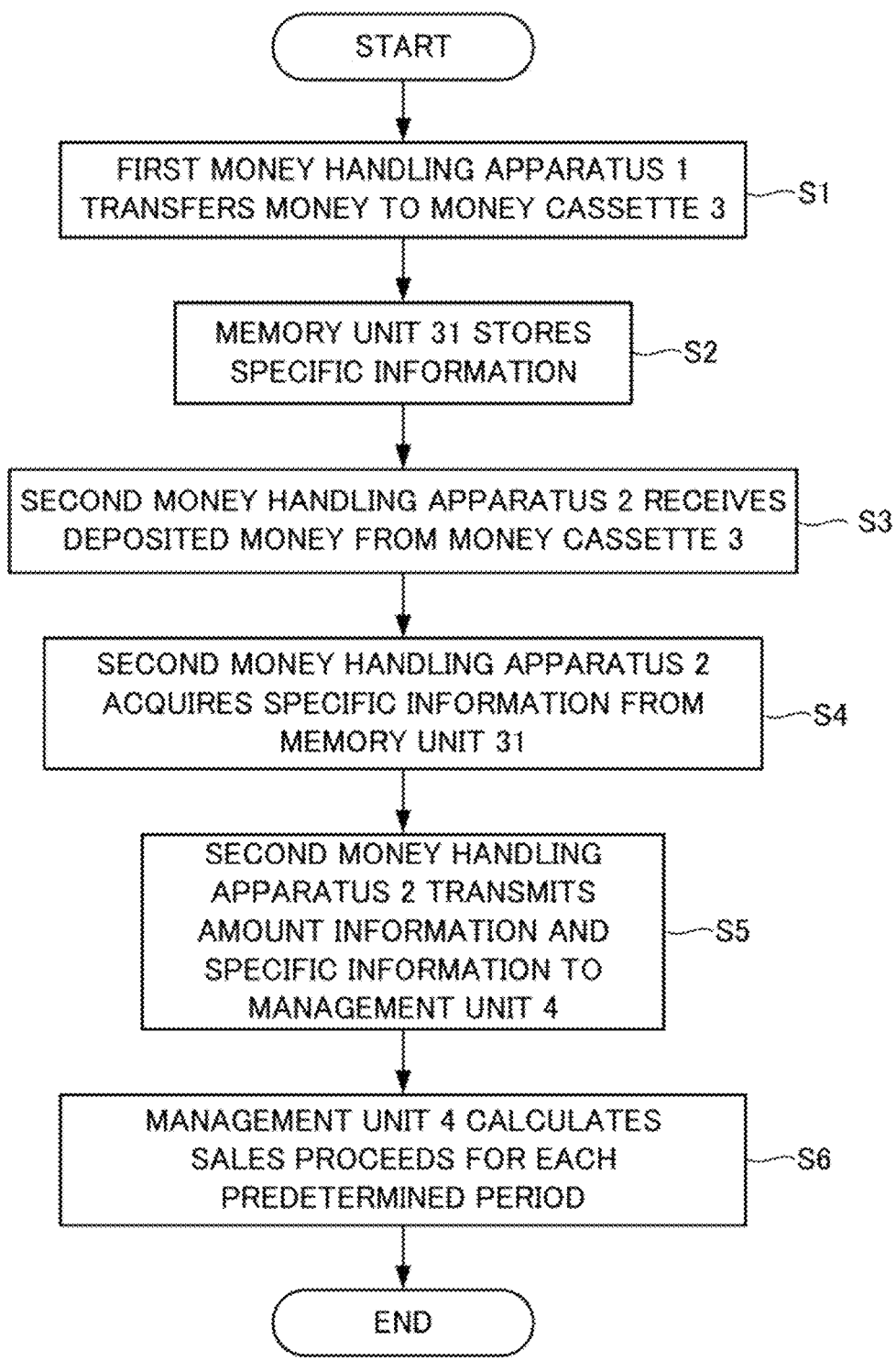
FIG. 2 is a flowchart illustrating the operation of the money handling system according to one or more aspects of the disclosed subject matter.

The operation of the money handling system 100 will be described with reference to FIG. 2.

In step S1, the first money handling apparatus 1 transfers money to the money cassette 3 attached thereto.

In step S2, the memory unit 31 of the money cassette 3 stores specific information that identifies a timing at which the money is transferred from the first money handling apparatus 1 to the money cassette 3.

After the money cassette 3 is transported to the second money handling apparatus 2, in step S3, the second money handling apparatus 2 receives transfer of the money from the money cassette 3.

In step S4, the second money handling apparatus 2 acquires the specific information from the memory unit 31 of the money cassette 3. The transfer of the money in step S3 and the acquisition of the specific information in step S4 may be performed simultaneously, or the acquisition of the specific information may be performed before the transfer of the money.

In step S5, the second money handling apparatus 2 transmits the specific information acquired from the money cassette 3 and deposit amount information indicating the amount transferred from the money cassette 3, which are associated with each other, to the management unit 4.

In step S6, the management unit 4 calculates the sales proceeds for each predetermined period based on the specific information and the deposit amount information. More specifically, the management unit 4 determines, based on the specific information, for which period the sales corresponding to the amount indicated by the deposit amount information are made, and counts sales for each predetermined period to calculate the sales proceeds. An example of the process of calculating the sales proceeds will be described in detail in Embodiment 2 described below.

The operation described above enables the management unit 4 to accurately determine, based on the specific information, for which period the money transferred to the second money handling apparatus 2 is to be counted as the sales proceeds. This ensures that sales proceeds are counted as those for a period for which the sales proceeds are to be counted.

Embodiment 2

A money handling system 101 according to Embodiment 2 of the present disclosure will be described with reference to FIG. 3. The money handling system 101 is assumed to be installed in a distribution store such as a specialty store, a convenience store, or a supermarket (hereinafter simply referred to as a store).

Figure 3:
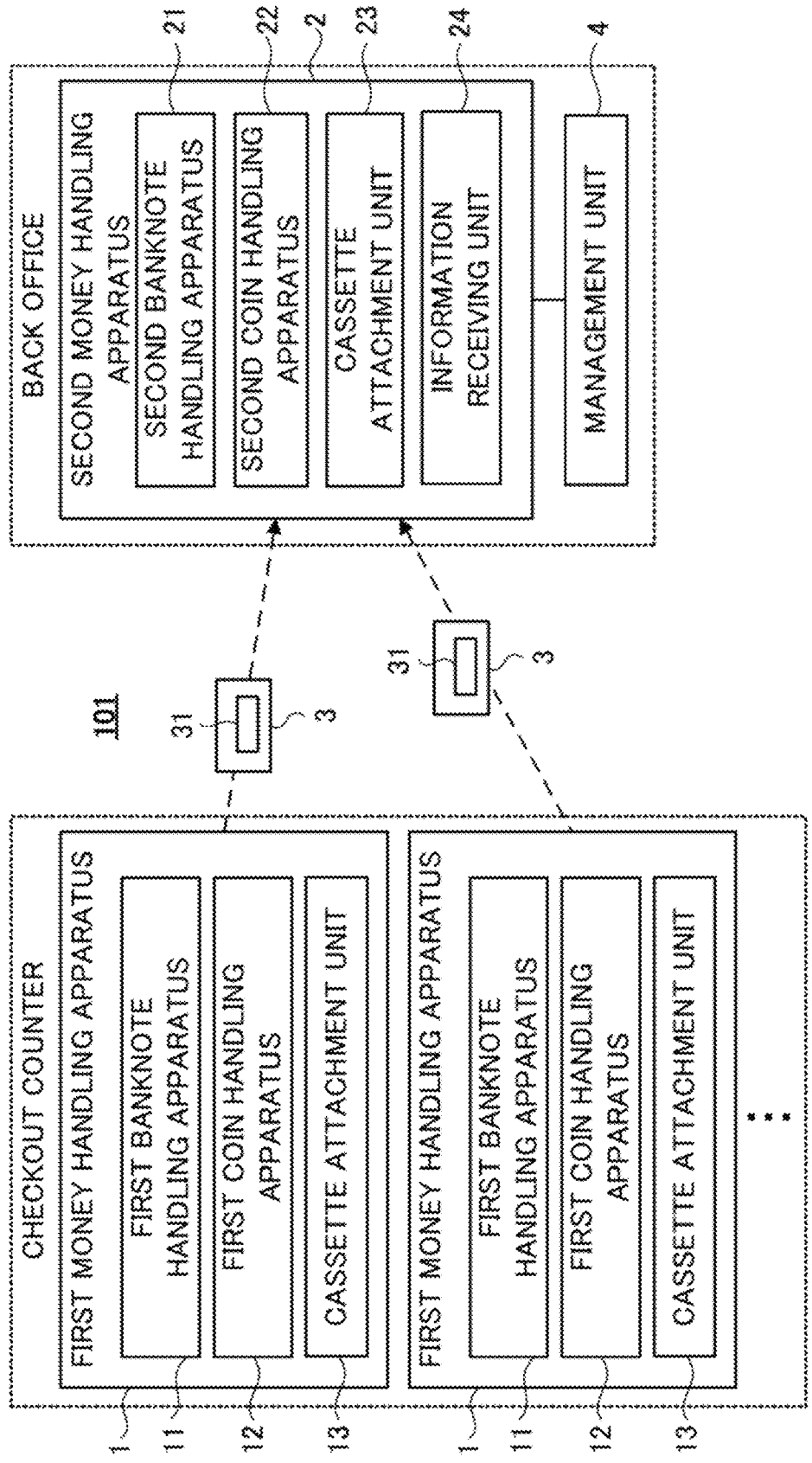
FIG. 3 is a diagram illustrating the configuration of a money handling system according to one or more aspects of the disclosed subject matter.

The money handling system 101 illustrated in FIG. 3 is a system for stores and is installed in a store. The money handling system 101 comprises a first money handling apparatus 1, a second money handling apparatus 2, a money cassette 3, and a management unit 4. In the example illustrated in FIG. 3, the money handling system 101 comprises two first money handling apparatuses 1. However, the money handling system 101 may comprise three or more first money handling apparatuses 1.

The first money handling apparatus 1 is installed at a checkout counter, which is an example of a front office of a store. The first money handling apparatus 1 is operated by an employee of the store or a customer in the store and used for the settlement process of a payment transaction carried out by the customer. The first money handling apparatus 1 receives a payment from the customer and returns change to the customer if any. The first money handling apparatus 1 may be communicably connected to a POS register to be operated by a store clerk or a self-checkout register to be operated by a customer. Further, the first money handling apparatus 1 may be integrated with the POS register or the self-checkout register.

The first money handling apparatus 1 comprises a first banknote handling apparatus 11 for handling banknotes, a first coin handling apparatus 12 for handling coins, and a cassette attachment unit 13. The first banknote handling apparatus 11 has a function of storing banknotes, and a function of depositing and dispensing banknotes. The first coin handling apparatus 12 has a function of storing coins, and a function of depositing and dispensing coins. The cassette attachment unit 13 is a portion to which the money cassette 3 is to be attached.

The money cassette 3 is a cassette for storing money. The money cassette 3 is configured to be attachable to the first money handling apparatus 1 in a removable manner. The money cassette 3 is configured to also be attachable to the second money handling apparatus 2 in a removable manner. The money cassette 3 is configured such that money can be transferred between the money cassette 3 and the first money handling apparatus 1 or the second money handling apparatus 2 while the money cassette 3 remains attached to the first money handling apparatus 1 or the second money handling apparatus 2.

The money cassette 3 is configured to prevent money contained in the money cassette 3 from being taken out while the money cassette 3 remains removed from the first money handling apparatus 1 and the second money handling apparatus 2. For example, an employee of the store transfers money between the first money handling apparatus 1 and the second money handling apparatus 2 by using the money cassette 3.

For example, before the store is opened, the employee transports the money cassette 3, to which money as a change fund has been transferred from the second money handling apparatus 2, to the first money handling apparatus 1 and transfers the money from the money cassette 3 to the first money handling apparatus 1. As a result, the first money handling apparatus 1 is replenished with the change fund. The first money handling apparatus 1 may be replenished with a change fund not only before the store is opened but also while the store is open. For example, the first money handling apparatus 1 is replenished with a change fund when the change fund has run out or is running out in the first money handling apparatus 1.

After the store is closed, the employee transports the money cassette 3, to which money as sales proceeds has been transferred from the first money handling apparatus 1, to the second money handling apparatus 2 and transfers the money from the money cassette 3 to the second money handling apparatus 2. As a result, the sales proceeds are collected from the first money handling apparatus 1. The employee is not allowed to touch the money in the money cassette 3 while transporting the money by using the money cassette 3. This enables safe transportation of money.

In Embodiment 2, the money cassette 3 is a cassette dedicated to banknotes or a cassette dedicated to coins. FIG. 3 illustrates that one money cassette 3 is transported from one first money handling apparatus 1 to the second money handling apparatus 2. However, a total of two money cassettes 3, namely, a money cassette 3 dedicated to banknotes and a money cassette 3 dedicated to coins, may be transported from one first money handling apparatus 1 to the second money handling apparatus 2. Alternatively, the money cassette 3 may be configured to be capable of storing both banknotes and coins, and banknotes and coins may be transported simultaneously using the single money cassette 3.

The money cassette 3 comprises a memory unit 31. The memory unit 31 stores specific information that identifies, for example, a timing at which money is transferred from the first money handling apparatus 1 to the money cassette 3. The specific information is transmitted from the memory unit 31 to the second money handling apparatus 2 via wired or wireless communication when the money cassette 3 is attached to the second money handling apparatus 2 and the money is transferred to the second money handling apparatus 2.

The second money handling apparatus 2 and the management unit 4 are installed in the back office of the store. The second money handling apparatus 2 is communicably connected to the management unit 4. In the example illustrated in FIG. 3, the first money handling apparatus 1 is not connected to the second money handling apparatus 2 or the management unit 4. However, the first money handling apparatus 1 may be communicably connected to the second money handling apparatus 2 and the management unit 4.

The second money handling apparatus 2 receives and manages money transported from the first money handling apparatus 1 via the money cassette 3. Specifically, the second money handling apparatus 2 counts the money transferred from the money cassette 3 to calculate the amount, and stores the money in a storage unit. Then, the second money handling apparatus 2 generates deposit amount information indicating the calculated amount and transmits the generated deposit amount information and the specific information acquired from the money cassette 3, which are associated with each other, to the management unit 4. The second money handling apparatus 2 acquires the specific information and the deposit amount information each time money is transferred from each of a plurality of first money handling apparatuses 1 to the second money handling apparatus 2 via the money cassette 3.

The second money handling apparatus 2 comprises a second banknote handling apparatus 21, a second coin handling apparatus 22, a cassette attachment unit 23, and an information receiving unit 24. The second banknote handling apparatus 21 has a function of storing banknotes, and a function of depositing and dispensing banknotes. The second coin handling apparatus 22 has a function of storing coins, and a function of depositing and dispensing coins. The cassette attachment unit 23 is a portion to which the money cassette 3 is to be attached. The information receiving unit 24 is a portion that acquires specific information from the memory unit 31 of the money cassette 3.

The second money handling apparatus 2 is configured to be communicably connected to the memory unit 31 of the money cassette 3 while the money cassette 3 remains attached to the cassette attachment unit 23. This allows the information receiving unit 24 to acquire the specific information from the memory unit 31 of the money cassette 3.

The management unit 4 manages the money stored in the second money handling apparatus 2. The management unit 4 also manages money to be put into and taken out of the second money handling apparatus 2. In the example illustrated in FIG. 3, the management unit 4 is configured separately from the second money handling apparatus 2. However, the management unit 4 and the second money handling apparatus 2 may be integrated with each other.

The management unit 4 comprises, for example, a processor such as a central processing unit (CPU) and a memory unit (such as a flash memory or a hard disk drive (HDD)), and the processor executes a program read from the memory unit to implement the following functions. In an exemplary implementation, the management unit 4 is encompassed by or may include processing circuitry which will be discussed later with respect to FIG. 6.

The management unit 4 receives the specific information and the deposit amount information, which are associated with each other, from the second money handling apparatus 2. The second money handling apparatus 2 may transmit the specific information and the deposit amount information to the management unit 4 each time money is transferred from each of a plurality of first money handling apparatuses 1 via the money cassette 3, or collectively transmit specific information and deposit amount information regarding money transferred within a predetermined period at the same time.

The management unit 4 stores deposit amount information and specific information regarding a single transfer of money in the memory unit of the management unit 4 or a memory unit communicably connected to the management unit 4 in association with each other. As a result, a plurality of pieces of deposit amount information and specific information, each regarding a single transfer of money, are stored in the memory unit. The management unit 4 determines for which period the sales corresponding to the amount indicated by each of the plurality of pieces of deposit amount information are made, based on the associated specific information, and counts sales for each predetermined period to calculate the sales proceeds. The details of the sales proceeds calculation process performed by the management unit 4 will be described below.

[Description of Specific Information]

The specific information will be described in detail. As described above, the specific information is information that identifies a timing at which money is transferred from the first money handling apparatus 1 to the money cassette 3. Three examples are given below as specific examples of the specific information.

(1) First Example of Specific Information

In a first example, the specific information is information indicating a timing at which the money cassette 3 to which money has been transferred from the first money handling apparatus 1 is removed from the cassette attachment unit 13 of the first money handling apparatus 1. In the first example, the money cassette 3 comprises an information generation unit (such as a processor). Upon detecting a removal of the money cassette 3 from the first money handling apparatus 1, the information generation unit generates specific information indicating the time period of the removal. In this case, the specific information may be information indicating the date on which the money cassette 3 is removed from the first money handling apparatus 1 or information indicating the time at which the money cassette 3 is removed from the first money handling apparatus 1.

(2) Second Example of Specific Information

In a second example, the specific information is information indicating a timing at which the first money handling apparatus 1 receives an instruction operation for transferring money from the first money handling apparatus 1 to the money cassette 3. When the first money handling apparatus 1 comprises an operation unit (such as an operation button, a keyboard, or a touch panel) and an information generation unit, upon an instruction operation being performed on the operation unit to transfer money to the money cassette 3, the information generation unit can generate specific information indicating the time period when the instruction operation is performed. In this case, the specific information may be information indicating the date on which the instruction operation for transferring money to the money cassette 3 is performed or information indicating the time at which the instruction operation for transferring money to the money cassette 3 is performed. The specific information generated by the information generation unit of the first money handling apparatus 1 is transmitted to the money cassette 3 via wired or wireless communication and stored in the memory unit 31.

An example of the instruction operation for transferring money to the money cassette 3 is an operation for executing an instruction to discharge money from the first money handling apparatus 1 to the money cassette 3. Another example of the instruction operation for transferring money to the money cassette 3 is an operation for executing an instruction to remove the money cassette 3 after the transfer of money to the money cassette 3 is completed.

(3) Third Example of Specific Information

In a third example, the specific information is recognition information for recognizing the money cassette 3. In the third example, the specific information is not generated at the timing when money is transferred from the first money handling apparatus 1 to the money cassette 3, but is stored in the memory unit 31 in advance.

In the third example, the first money handling apparatus 1 generates, at the timing when money is transferred from the first money handling apparatus 1 to the money cassette 3, transfer information indicating the timing of the transfer of the money. The transfer information comprises recognition information of the money cassette 3 to which the money has been transferred. The first money handling apparatus 1 transmits the generated transfer information to the management unit 4.

Accordingly, in a case where the third example is used, unlike the example illustrated in FIG. 3, the first money handling apparatus 1 and the management unit 4 are connected in such a manner that enables at least transmission of information from the first money handling apparatus 1 to the management unit 4.

In the third example, the specific information need not be newly stored in the memory unit 31 of the money cassette 3 in response to money being transferred from the first money handling apparatus 1 to the money cassette 3. This simplifies hardware and software that create an interface between the first money handling apparatus 1 and the memory unit 31. This also enables an employee of the store to remove the money cassette 3 from the first money handling apparatus 1 after completion of the transfer of the money without having to check whether the specific information is reliably stored in the memory unit 31, resulting in smooth removal of the money cassette 3.

Sales Proceeds Calculation Process

Figure 4:
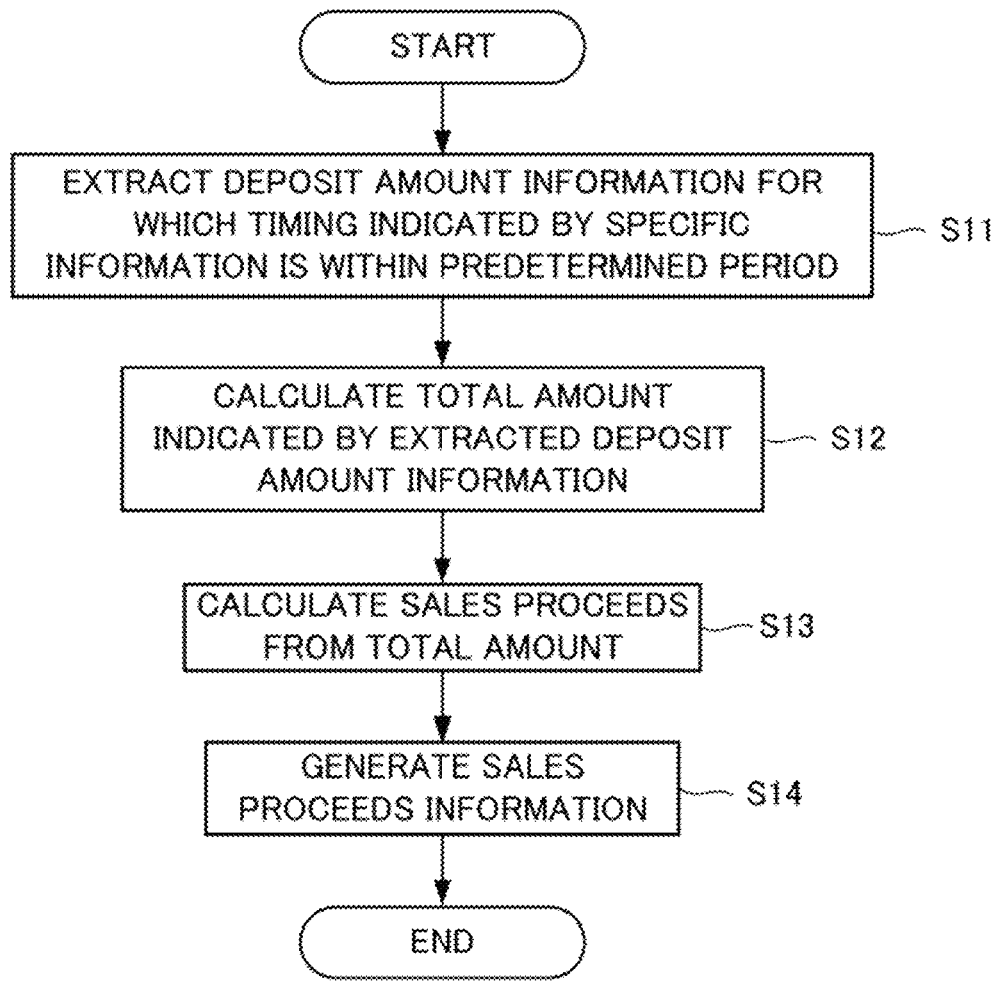
FIG. 4 is a flowchart illustrating a sales proceeds calculation process.

The sales proceeds calculation process performed by the management unit 4 will be described in detail. The sales proceeds calculation process is automatically started, for example, at a predetermined time after the store is closed. Alternatively, the sales proceeds calculation process is started in response to an operation of an administrator of the money handling system 101 (such as a person responsible for supervising the operation of the store where the money handling system 101 is installed). FIG. 4 is a flowchart illustrating the sales proceeds calculation process. It is assumed that, at the start of the flowchart illustrated in FIG. 4, a plurality of pieces of specific information and deposit amount information, each regarding a single transfer of money, which are acquired from the second money handling apparatus 2, are stored in the memory unit of the management unit 4 or a memory unit communicably connected to the management unit 4. In the following description, as an example, the specific information is information indicating a timing at which the money cassette 3 is removed from the cassette attachment unit 13 of the first money handling apparatus 1 (the first example described above).

In step S11, the management unit 4 extracts, based on the plurality of pieces of specific information and deposit amount information, a piece of deposit amount information for which the timing indicated by the corresponding specific information is within a predetermined period. As described above, the timing indicated by the specific information is a timing at which money is transferred from the first money handling apparatus 1 to the money cassette 3.

The predetermined period is a period of time that is determined by the administrator or the like of the money handling system 101 and that is the unit by which sales proceeds are counted. Examples of the predetermined period include one day, one week, and one month. When the predetermined period is one day, the predetermined period may be one calendar day or may be set in accordance with the operating hours of the store when the store operates across days such as from 10:00 a.m. to 1:00 a.m. When the predetermined period is one day, for example, the predetermined period may be a same day or a day in the past. The predetermined period may be set to any period of time by the administrator or others as appropriate. The predetermined period may be set in advance before the start of the sales proceeds calculation process, or, when the sales proceeds calculation process is started in response to an operation of the administrator, the predetermined period may be set each time the sales proceeds calculation process is started.

When the predetermined period is a same day, for example, the management unit 4 calculates the sales proceeds for the day after the store is closed. In this case, the management unit 4 refers to the plurality of pieces of specific information and deposit amount information stored in the memory unit and extracts a piece of deposit amount information for which the timing indicated by the corresponding specific information is within the same day.

When the specific information is information indicating a date, the management unit 4 extracts deposit amount information associated with the specific information indicating that the date on which the money cassette 3 is removed is the same day. When the specific information is information indicating a time, the management unit 4 extracts deposit amount information associated with the specific information indicating that the time at which the money cassette 3 is removed is within the same day.

In step S12, the management unit 4 calculates a total amount indicated by the extracted deposit amount information.

In step S13, the management unit 4 calculates the sales proceeds based on the total deposit amount. Specifically, for example, in the case of an operation in which no money is left in the first money handling apparatus 1 after the closing of the store, the total amount of the change fund with which the first money handling apparatus 1 has been replenished before the opening of the store is subtracted from the total deposit amount to calculate the sales proceeds.

In step S14, the management unit 4 generates sales proceeds information indicating the amount of the sales proceeds for the predetermined period, based on the sales proceeds calculated in step S13. The sales proceeds information may be stored and managed in the memory unit of the management unit 4, or may be output to the outside and used for predetermined data processing (such as sales analysis).

The above description of the sales proceeds calculation process is for a case where the specific information is information indicating a timing at which the money cassette 3 is removed from the cassette attachment unit 13 of the first money handling apparatus 1, that is, the case of the specific information in the first example described above. Also in the case of the specific information in the second example, it is possible to calculate sales proceeds in a way similar to that of the sales proceeds calculation process described above.

In the case of the third example in which the specific information is recognition information of the money cassette 3, prior to step S11 in FIG. 4, the management unit 4 performs a process of identifying a timing at which money is transferred from the first money handling apparatus 1 to the money cassette 3, based on the transfer information and the specific information. As described above, the transfer information is information acquired from the first money handling apparatus 1 in advance and indicating a timing at which money is transferred from the first money handling apparatus 1 to the money cassette 3, and comprises recognition information of the money cassette 3.

The management unit 4 checks the recognition information of the money cassette 3 comprised in the transfer information against the specific information (i.e., the recognition information of the money cassette 3) and extracts the transfer information if the recognition information comprised therein matches the specific information. As a result, the management unit 4 can derive a timing at which the money corresponding to the deposit amount information associated with the specific information is transferred from the first money handling apparatus 1 to the money cassette 3. Thereafter, the management unit 4 executes the steps illustrated in FIG. 4. Thus, the management unit 4 can calculate sales proceeds in a way similar to that in the first example.

In the third example, the transfer information is information indicating a timing at which money is transferred from the first money handling apparatus 1 to the money cassette 3. Alternatively, for example, the transfer information may be information indicating that money has been transferred from the first money handling apparatus 1 to the money cassette 3. In this case, the management unit 4 stores in the memory unit timing information indicating a timing at which the transfer information is received from the first money handling apparatus 1, in association with the transfer information. In this case, the management unit 4 can derive, based on the transfer information, the timing information, and the specific information, the timing at which the money corresponding to the deposit amount information associated with the specific information is transferred from the first money handling apparatus 1 to the money cassette 3.

Effects

Effects achieved by the money handling system 101 according to Embodiment 2 will be described in detail. As described above, in the money handling system 101, the management unit 4 extracts, based not on a timing at which money is transferred from the money cassette 3 to the second money handling apparatus 2 but on a timing at which money is transferred from the first money handling apparatus 1 to the money cassette 3, deposit amount information for which the timing is within a predetermined period, and calculates the sales proceeds based on the extraction result. As a result, the following effects are achieved.

Any problem, such as an operational problem in the store, a problem with the first or second money handling apparatus 1 or 2, or a mistake made by an employee of the store, may cause a delay in the transfer of money from the money cassette 3 to the second money handling apparatus 2. In this case, the transfer of money from the money cassette 3 to the second money handling apparatus 2 may be delayed.

Some money handling systems that do not have a configuration according to an embodiment of the present disclosure may be configured to extract deposit amount information in which a timing at which money is transferred from a money cassette to a second money handling apparatus is within a predetermined period and calculate sales proceeds information based on the extracted deposit amount information. Such a money handling system may fail to count, as the sales proceeds for the predetermined period, deposit amount information that would otherwise be counted as the sales proceeds for the predetermined period.

This situation will be described using a specific example. For example, when the predetermined period is one day (same day) and the money to be counted as that for the same day is actually transferred from the money cassette to the second money handling apparatus on the next day due to a problem or the like, the amount to be counted as the sales proceeds for the same day is counted as the sales proceeds for the next day.

In such a money handling system, for example, to count the money that is transferred to the second money handling apparatus on the next day as the sales proceeds for the same day, the employee needs to perform a plurality of steps of operation on the second money handling apparatus.

Figure 5A:
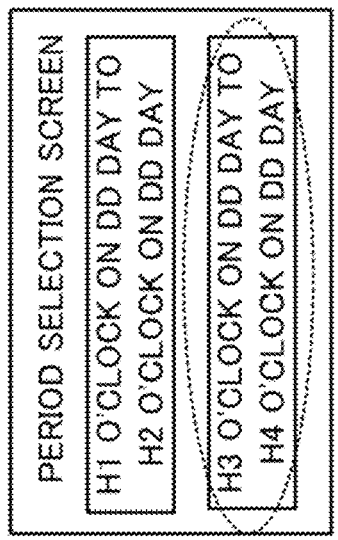
FIG. 5A is a diagram illustrating an operation for depositing sales proceeds in a case where a configuration according to an embodiment of the present disclosure is not applied.
Figure 5A:
Figure 5A:
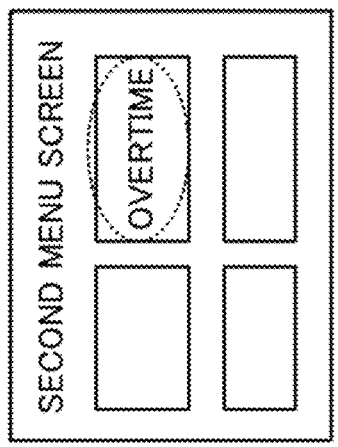
Figure 5B:
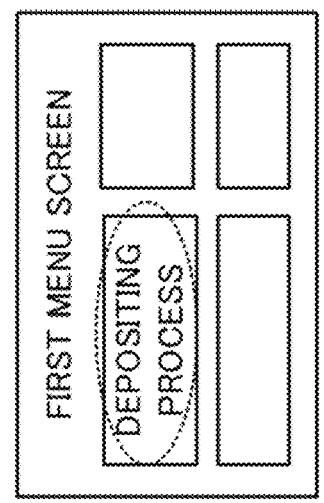
FIG. 5B is a diagram illustrating an operation for depositing sales proceeds according to an embodiment of the present disclosure.

FIG. 5A is a view illustrating an example operation to be performed in a money handling system that does not have a configuration according to an embodiment of the present disclosure during the transfer of money when the money transferred to a second money handling apparatus after the lapse of a predetermined period is to be counted as the sales proceeds for the predetermined period. Screens illustrated in FIG. 5A and a screen illustrated in FIG. 5B described below are displayed on a display comprised in the second money handling apparatus 2. In FIG. 5A, an employee of the store who has transported the money cassette 3 storing money as the sales proceeds for the same day to the second money handling apparatus 2 selects "Depositing Process" on a first menu screen. In response to the selection on the first menu screen, a second menu screen is newly displayed, on which the employee selects "Overtime". In FIG. 5A and FIG. 5B described below, options being selected by the employee are illustrated surrounded by broken lines. Then, a period selection screen is newly displayed to select a period of time for which the money in the money cassette is to be counted. In response to the employee selecting an appropriate period on the period selection screen, the money in the money cassette can be transferred to the second money handling apparatus as sales proceeds for a predetermined period even after the predetermined period has passed.

In the money handling system 101, in contrast, specific information indicating a timing at which money is transfer from the first money handling apparatus 1 to the money cassette 3 is stored in the memory unit 31 of the money cassette 3. When the money is transferred from the money cassette 3 to the second money handling apparatus 2, the specific information is also acquired by the second money handling apparatus 2. In other words, the specific information in the money handling system 101 indicates the timing at which the money transferred to the money cassette 3 is to be counted as sales proceeds. The management unit 4 can extract the deposit amount information associated with the specific information as deposit amount information to be counted for the same day.

As a result, for example, when the predetermined period is the same day and the money to be counted as the sales proceeds for the same day is actually transferred from the money cassette 3 to the second money handling apparatus 2 on the next day due to a problem or the like, the money in the money cassette 3 can easily be counted as the sales proceeds for the same day without causing the employee who has transported the money cassette 3 to the second money handling apparatus 2 to perform any special operation.

As a specific example operation, as illustrated in FIG. 5B, the employee simply selects "Depositing Process" on the first menu screen.

Accordingly, the money handling system 101 according to Embodiment 2 of the present disclosure eliminates the need for the employee who transports the money cassette 3 to take into account the predetermined period for which the money stored in the money cassette 3 is to be counted. The employee simply attaches the money cassette 3 to the second money handling apparatus 2 and selects "Depositing Process" on the menu screen to transfer the money. As a result, even when sales proceeds are transported using the money cassette 3 after the lapse of a predetermined period, the time and effort required to transfer the money in the money cassette 3 to the second money handling apparatus 2 can be greatly reduced. In addition, the amount of operation required to transfer the money from the money cassette 3 to the second money handling apparatus 2 is reduced. This can prevent an operation error and prevent a problem caused by such an operation error.

Regarding Predetermined Period

In Embodiment 2 described above, examples of the predetermined period include one day, one week, and one month. However, the present disclosure is not limited to these. The predetermined period may be set as desired by the administrator or the like of the money handling system 101, for example. For example, the predetermined period may be set in units of hours, minutes, or the like, such as from 9:00 a.m. to 10:00 p.m. In this case, for example, the predetermined period can be set in accordance with the opening hours of the store. In addition, the end of the predetermined period may be set to a certain time after the end of the opening hours of the store with sufficient lead time to ensure that an employee of the store can transport the money cassette 3 from the first money handling apparatus 1 to the second money handling apparatus 2 after the store is closed.

Figure 6:
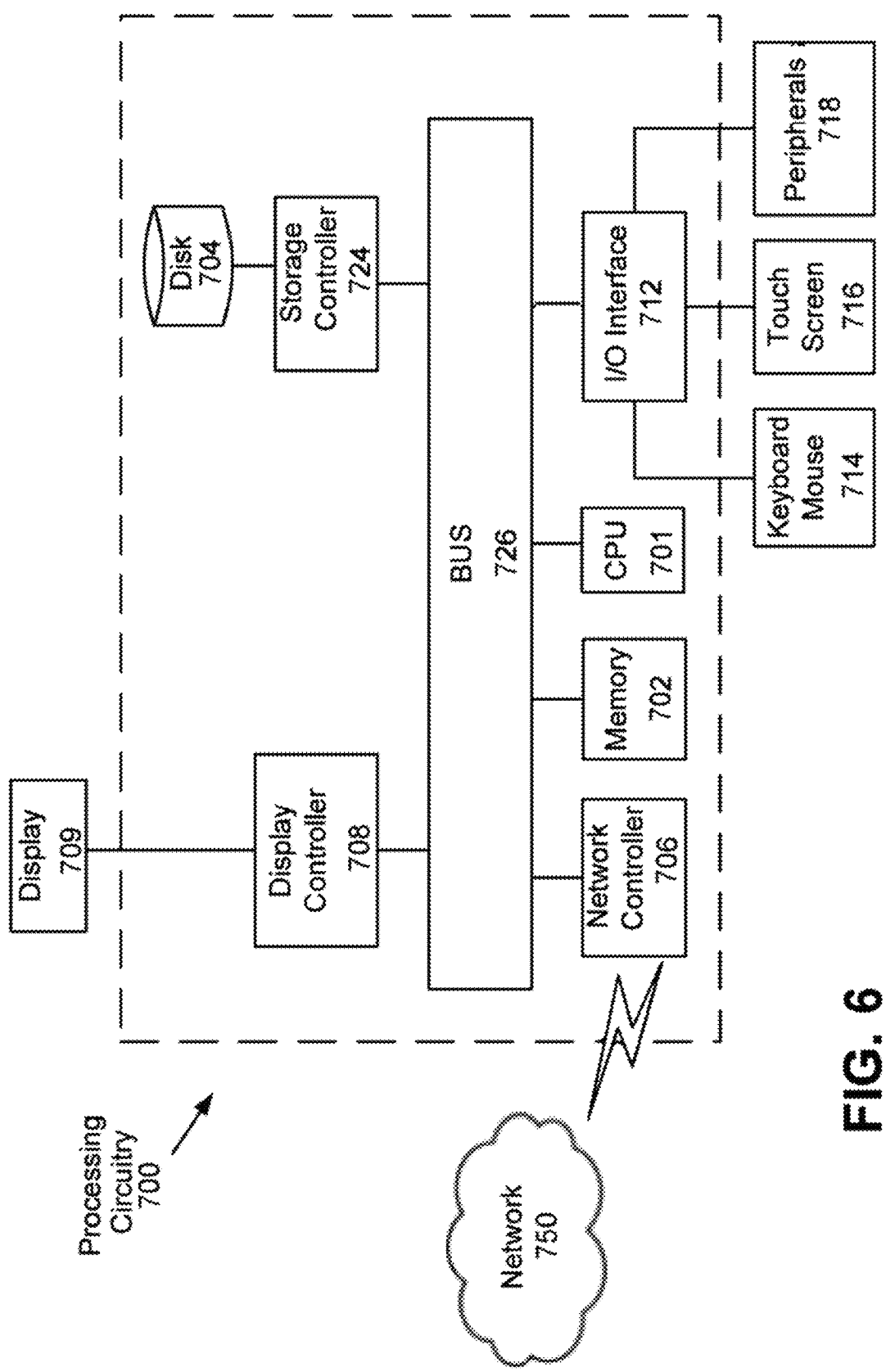
FIG. 6 is a block diagram of processing circuitry that performs computer-based operations in accordance with the present disclosure.

FIG. 6 is a block diagram of processing circuitry that performs computer-based operations in accordance with the present disclosure. FIG. 6 illustrates processing circuitry 700 which is included in or encompasses the management unit 4, for example, which is a component of the money handling system 100 and/or the money handling system 101.

Processing circuitry 700 is used to control any computer-based and cloud-based control processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The functionality of the elements disclosed herein may be implemented using circuitry or processing circuitry which may include general purpose processors, special purpose processors, integrated circuits, ASICs ("Application Specific Integrated Circuits"), conventional circuitry and/or combinations thereof which are configured or programmed to perform the disclosed functionality. Processors are processing circuitry or circuitry as they include transistors and other circuitry therein. The processor may be a programmed processor which executes a program stored in a memory. In the disclosure, the processing circuitry, units, or means are hardware that carry out or are programmed to perform the recited functionality. The hardware may be any hardware disclosed herein or otherwise known which is programmed or configured to carry out the recited functionality.

In FIG. 6, the processing circuitry 700 includes a CPU 701 which performs one or more of the control processes discussed in this disclosure. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other non-transitory computer readable medium of an information processing device with which the processing circuitry 700 communicates, such as a server or computer. The processes may also be stored in network based storage, cloud-based storage or other mobile accessible storage and executable by processing circuitry 700.

Further, the claimed advancements may be provided as a utility application, background daemon, or component of an operating system, or combination thereof, executing in conjunction with CPU 701 and an operating system such as Microsoft Windows, UNIX, Solaris, LINUX, Apple MAC-OS, Apple iOS and other systems known to those skilled in the art.

The hardware elements in order to achieve the processing circuitry 700 may be realized by various circuitry elements. Further, each of the functions of the above described embodiments may be implemented by circuitry, which includes one or more processing circuits. A processing circuit includes a particularly programmed processor, for example, processor (CPU) 701, as shown in FIG. 6. A processing circuit also includes devices such as an application specific integrated circuit (ASIC) and conventional circuit components arranged to perform the recited functions.

In FIG. 6, the processing circuitry 700 may be a computer or a particular, special-purpose machine. Processing circuitry 700 is programmed to execute processing to control terminal device 10/server device 20.

Alternatively, or additionally, the CPU 701 may be implemented on an FPGA, ASIC, PLD or using discrete logic circuits, as one of ordinary skill in the art would recognize. Further, CPU 701 may be implemented as multiple processors cooperatively working in parallel to perform the instructions of the inventive processes described above.

The processing circuitry 700 in FIG. 6 also includes a network controller 706, such as an Ethernet PRO network interface card, for interfacing with network 750. As can be appreciated, the network 750 can be a public network, such as the Internet, or a private network such as a local area network (LAN) or wide area network (WAN), or any combination thereof and can also include Public Switched Telephone Network (PSTN) or Integrated Services Digital Network (ISDN) sub-networks. The network 750 can also be wired, such as an Ethernet network, universal serial bus (USB) cable, or can be wireless such as a cellular network including EDGE, 3G and 4G wireless cellular systems. The wireless network can also be Wi-Fi, wireless LAN, Bluetooth, or any other wireless form of communication that is known. Additionally, network controller 706 may be compliant with other direct communication standards, such as Bluetooth, a near field communication (NFC), infrared ray or other.

The processing circuitry 700 further includes a display controller 708, such as a graphics card or graphics adaptor for interfacing with display 709, such as a monitor. An I/O interface 712 interfaces with a keyboard and/or mouse 714 as well as a touch screen panel 716 on or separate from display 709. I/O interface 712 also connects to a variety of peripherals 718.

The storage controller 724 connects the storage medium disk 704 with communication bus 726, which may be an ISA, EISA, VESA, PCI, or similar, for interconnecting all of the components of the processing circuitry 700. A description of the general features and functionality of the display 709, keyboard and/or mouse 714, as well as the display controller 708, storage controller 724, network controller 706, and I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

INDUSTRIAL APPLICABILITY

One or more aspects of the present disclosure are suitable for use in a money handling system comprising a money handling apparatus for depositing and dispensing money.

The invention claimed is:
1. A money handling system comprising:
a first money handling apparatus;
a money cassette to which money is to be transferred from the first money handling apparatus;
a second money handling apparatus to which the money is to be transferred from the money cassette;
a memory disposed in the money cassette and configured to store specific information that identifies a timing at which an instruction operation is received to transfer the money from the first money handling apparatus to the money cassette,
wherein the second money handling apparatus acquires, from the money cassette, the specific information, and counts the money transferred from the money cassette to the second money handling apparatus to generate deposit amount information indicating the amount transferred from the money cassette; and
processing circuitry configured to
receive the specific information and the deposit amount information,
extract, based on the plurality of pieces of specific information and deposit amount information, the deposit amount information for which the timing indicated by the corresponding specific information is within a predetermined period, and determine, based on a total amount indicated by the extracted deposit amount information, sales proceeds for the predetermined period, wherein
in response to the money cassette being attached to the second money handling apparatus after the predetermined period has elapsed, the processing circuitry is further configured to add the amount of the money transferred from the money cassette to the second money handling apparatus to sales proceeds for the predetermined period when the timing identified by the specific information is within the predetermined period.

2. The money handling system according to claim 1, wherein
the money handling system comprises a plurality of the first money handling apparatuses, each of the plurality of first money handling apparatuses being configured to perform a process for settling a payment, and
the second money handling apparatus performs a depositing process on money transferred from each of the plurality of first money handling apparatuses to the money cassette.

3. The money handling system according to claim 1, wherein
the specific information is information that identifies a timing at which the money cassette storing the transferred money is removed from the first money handling apparatus.

4. The money handling system according to claim 1, wherein
the specific information is information that identifies a timing at which the first money handling apparatus receives the instruction operation.

5. The money handling system according to claim 1, wherein
the second money handling apparatus comprises the processing circuitry.

6. A money handling method, wherein a money handling system includes a first money handling apparatus, a money cassette to which money is to be transferred from the first money handling apparatus, a memory disposed in the money cassette and configured to store specific information that identifies a timing at which an instruction operation is received to transfer the money from the first money handling apparatus to the money cassette, a second money handling apparatus to which the money is to be transferred from the money cassette, and counts the money transferred from the money cassette to the second money handling apparatus to generate deposit amount information indicating the amount transferred from the money cassette, and processing circuitry, the method comprising:
receiving the specific information and the deposit amount information;
extracting, based on the plurality of pieces of specific information and deposit amount information, the deposit amount information for which the timing indicated by the corresponding specific information is within a predetermined period;
determining, based on a total amount indicated by the extracted deposit amount information, sales proceeds for the predetermined period; and
in response to the money cassette being attached to the second money handling apparatus after the predetermined period has elapsed, adding the amount of the money transferred from the money cassette to the second money handling apparatus to sales proceeds for the predetermined period when the timing identified by the specific information is within the predetermined period.

7. The money handling method according to claim 6, wherein
the determining of sales proceeds for the predetermined period includes calculating sales proceeds for one day.

8. The money handling method according to claim 6, wherein
the determining of sales proceeds for the predetermined period includes calculating sales proceeds for a preset period from a first predetermined time to a second predetermined time.

9. The money handling method according to claim 6, wherein
the specific information is information that identifies a date on which the money is transferred.

10. The money handling method according to claim 6, wherein
the specific information is information that identifies a time at which the money is transferred.

11. The money handling method according to claim 6, further comprising:
in response to the money cassette being attached to the second money handling apparatus after the predetermined period has elapsed, adding the amount of the money transferred from the money cassette to the second money handling apparatus to sales proceeds for the predetermined period when the timing identified by the specific information is within the predetermined period.

12. A money handling apparatus, comprising:
a cassette attachment unit to which a money cassette in which money is stored is to be attached;
a money handler that handles the money, the money being transferred from the money cassette and counts the money transferred from the money cassette to the money handling apparatus to generate deposit amount information indicating the amount transferred from the money cassette;
a receiver configured to receive specific information from a memory disposed in the money cassette, the specific information being information that identifies a timing at which an instruction operation is received to transfer the money via the money cassette; and
processing circuitry configured to
receive the specific information and the deposit amount information,
extract, based on the plurality of pieces of specific information and deposit amount information, the deposit amount information for which the timing indicated by the corresponding specific information is within a predetermined period, and
determine, based on a total amount indicated by the extracted deposit amount information, sales proceeds for the predetermined period, wherein
in response to the money cassette being attached to the second money handling apparatus after the predetermined period has elapsed, the processing circuitry is further configured to add the amount of the money transferred from the money cassette to the second money handling apparatus to sales proceeds for the predetermined period when the timing identified by the specific information is within the predetermined period.

* * * * *